US009294413B2

(12) United States Patent
Kullangal Sridhara et al.

(10) Patent No.: US 9,294,413 B2
(45) Date of Patent: *Mar. 22, 2016

(54) MEDIA PLAYOUT FOR VOIP APPLICATIONS

(71) Applicant: QUALCOMM Incorporated, San Diego, CA (US)

(72) Inventors: Dinesh Kullangal Sridhara, San Diego, CA (US); Siddharth Ryan Franco, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/061,375

(22) Filed: Oct. 23, 2013

(65) Prior Publication Data

US 2015/0109925 A1    Apr. 23, 2015

(51) Int. Cl.
*H04L 12/823* (2013.01)
*H04L 12/911* (2013.01)
*H04L 12/835* (2013.01)
*H04M 7/00* (2006.01)
*H04L 29/06* (2006.01)

(52) U.S. Cl.
CPC .............. *H04L 47/32* (2013.01); *H04L 47/30* (2013.01); *H04L 47/74* (2013.01); *H04L 65/1059* (2013.01); *H04L 65/604* (2013.01); *H04L 65/80* (2013.01); *H04M 7/006* (2013.01)

(58) Field of Classification Search
CPC .......... H04L 47/32; H04L 47/74; H04L 47/30
See application file for complete search history.

(56) References Cited

U.S. PATENT DOCUMENTS

| 5,276,681 | A | 1/1994 | Tobagi et al. |
| 6,822,940 | B1 * | 11/2004 | Zavalkovsky et al. ........ 370/237 |
| 7,768,919 | B1 | 8/2010 | Conway |
| 7,957,323 | B2 | 6/2011 | Uyehara et al. |
| 8,238,341 | B2 * | 8/2012 | Ho ................................. 370/394 |

(Continued)

OTHER PUBLICATIONS

Azami S B.Z., et al., "Evaluating the Effects of Buffer Management on Voice 22 Transmission Over Packet, Switching Networks", ICC 2001. 2001 IEEE International Conference on Communications. Conference Record, Helsinky, Finland, Jun. 11-14, 2001, [IEEE International Conference on Communications], New York, NY, IEEE, US, vol. 3, Jun. 11, 2001 pp. 738-742, XP919553199.

(Continued)

*Primary Examiner* — Paul H Masur
*Assistant Examiner* — Kabir Jahangir
(74) *Attorney, Agent, or Firm* — The Marbury Law Group, PLLC

(57) ABSTRACT

To address limitations of conventional packet buffer management strategies, the various embodiments provide methods implemented by a processor operating on a VoIP receiver device for managing media packet rejection logic on the receiving device to improve audio playout. The embodiment methods enhance the likelihood that a receiver device will buffer (rather than reject) an incoming media packet by maintaining a history of previously rejected media packets (i.e., a packet rejection history) and referencing the packet rejection history when determining whether to reject or to accept an incoming packet the receiver device has just received. Thus, the various embodiments may reduce gaps in playback by avoiding unnecessary packet rejections and may promote an overall increase in playout quality.

20 Claims, 9 Drawing Sheets

(56) References Cited

U.S. PATENT DOCUMENTS

| | | |
|---|---|---|
| 2004/0090917 A1* | 5/2004 | Ruutu et al. ............... 370/235 |
| 2004/0190537 A1 | 9/2004 | Ferguson et al. |
| 2005/0094563 A1 | 5/2005 | Takeshita et al. |
| 2005/0207437 A1 | 9/2005 | Spitzer |
| 2005/0238013 A1 | 10/2005 | Tsuchinaga et al. |
| 2006/0039393 A1* | 2/2006 | Firoiu et al. ............... 370/412 |
| 2007/0230493 A1 | 10/2007 | Dravida et al. |
| 2008/0279102 A1* | 11/2008 | Sankaran et al. ............ 370/235 |
| 2009/0040929 A1* | 2/2009 | Lee et al. ................... 370/235 |
| 2010/0188977 A1* | 7/2010 | Rochon et al. .............. 370/235 |
| 2012/0051366 A1 | 3/2012 | Li et al. |
| 2013/0258851 A1* | 10/2013 | Mayya et al. ............... 370/235 |
| 2014/0204749 A1* | 7/2014 | Sabato et al. ............... 370/235 |
| 2015/0110103 A1 | 4/2015 | Kullangal et al. |

OTHER PUBLICATIONS

International Search Report and Written Opinion—PCT/US2014/061834—ISA/EPO—Feb. 4, 2015.

Jayasumana Colorado State University N Piratla Deutsche Telekom Labs T Banka Colorado State University A Bare R Whitner Agilent Te: "Improved Packet Reordering Metrics; rfc5236.txt", Jun. 1, 2008, XP015057215,ISSN: 0000-0003.

* cited by examiner

MEDIA PLAYOUT FOR VOIP APPLICATIONS

RELATED APPLICATIONS

This application is related to U.S. patent application Ser. No. 14/061,418 entitled "Improved Media Playout for VOID Applications" filed concurrently herewith.

BACKGROUND

Voice over IP (or voice over Internet Protocol "VoIP") is a methodology and group of technologies for the delivery of voice communications and multimedia sessions over Internet Protocol (IP) networks, such as the Internet. VoIP is available on many smartphones, personal computers, and on Internet-accessible devices. For example, a smartphone user may make calls and SMS text messages through VoIP over a 3G or Wi-Fi network.

VoIP technologies enable media streaming over IP networks using special media delivery protocols that encode voice, audio, video, etc. as sequential packets of data. Typically, the media content is split into multiple packets of media data that are sent from an originating device to a receiving device. Each media packet includes a sequence number that is used when determining the order of playout on the receiving device.

The receiving device may receive the media packets individually or in a burst (i.e., several packets sent as a group), the latter usually occurring when there is a network delay/backlog in packet delivery. The receiving device stores media packets in a buffer of a fixed size for play out in sequential order. After finishing playing a media packet, the receiving device removes the media packet from the buffer to make room for other media packets. Occasionally, given the limited space in the buffer, the receiver device will discard or reject new media packets that are received when the playout buffer is full or when the receiver device does not have the resources to process the media packets because other tasks have a higher priority (which is sometimes referred to as "task preemption"). This may especially be the case when the media packets arrive in a burst, which increases the likelihood that the buffer cannot hold every media packet in the burst or that the receiver device can process every packet in the burst.

SUMMARY

The various embodiments include receiver devices and methods of managing voice over Internet protocol (VoIP) media packet buffering and playback on receiver devices to improve reception. An embodiment method includes calculating a number of free buffer slots required to store an incoming packet in the buffer, determining a number of previously rejected packets based on a packet rejection history, calculating an adjusted number of required free buffer slots as a difference between the number of required free buffer slots and the number of previously rejected packets, determining a number of free slots in the buffer, determining whether the adjusted number of required free buffer slots exceeds the number of free slots in the buffer, rejecting the incoming packet and updating the packet rejection history to include an entry for the rejected incoming packet in response to determining that the adjusted number of required free buffer slots exceeds the number of free slots in the buffer, and storing the incoming packet in the buffer in sequential order in response to determining that the adjusted number of required free buffer slots does not exceed the number of free slots in the buffer.

In an embodiment, calculating a number of free buffer slots required to store the incoming packet in the buffer may include determining a sequence number of the incoming packet, determining a sequence number of a last-buffered packet, and calculating the number of required free buffer slots as a difference between the sequence number of the incoming packet and the sequence number of the last-buffered packet.

In an embodiment, determining a number of previously rejected packets based on the packet rejection may include determining a sequence number of the incoming packet, determining a sequence number of the last-buffered packet, and determining the number of previously rejected packets in the packet rejection history having a sequence number greater than the sequence number of the last-buffered packet and less than the sequence number of the incoming packet.

In an embodiment, storing the incoming packet in the buffer in sequential order may include determining a slot index value of a last-buffered packet, determining whether the adjusted number of required free buffer slots is a negative number, storing the incoming packet in a slot of the buffer based on the slot index value of the last-buffered packet and the adjusted number of required free buffer slots in response to determining that the adjusted number of required free buffer slots is not a negative number, and in response to determining that the adjusted number of required free buffer slots is a negative number performing operations including determining a number of rejected packets in the packet rejection history between the sequence number of the incoming packet and a sequence number of the last-buffered packet, calculating a slot index offset based on the adjusted number of required free buffer slots and the determined number of rejected packets in the packet rejection history between the sequence number of the incoming packet and a sequence number of the last-buffered packet, and storing the incoming packet in a slot of the buffer based on the slot index value of the last-buffered packet and the slot index offset.

In an embodiment, the method may further include determining a sequence number of a packet in the buffer that is playing, determining whether there is an entry in the packet rejection history for a packet having a sequence number less than the sequence number of the packet in the buffer that is playing, and removing the entry from the packet rejection history in response to determining that there is an entry in the packet rejection history for a packet having a sequence number less than the sequence number of the packet in the buffer that is playing.

A further embodiment includes a receiver device having a transceiver configured to receive VoIP media packets, a memory configured as a buffer for receiving and buffering VoIP media packets, and a processor configured with processor executable instructions to perform the operations of the embodiment methods described above.

A further embodiment includes a receiver device having a means for receiving voice over Internet protocol (VoIP) media packets, a buffering means for buffering received VoIP media packets, and various means for performing the functions of the methods described above.

A further embodiment includes a non-transitory processor-readable storage medium having stored thereon processor-executable instructions configured to cause a processor of a receiver device to perform operations to perform of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
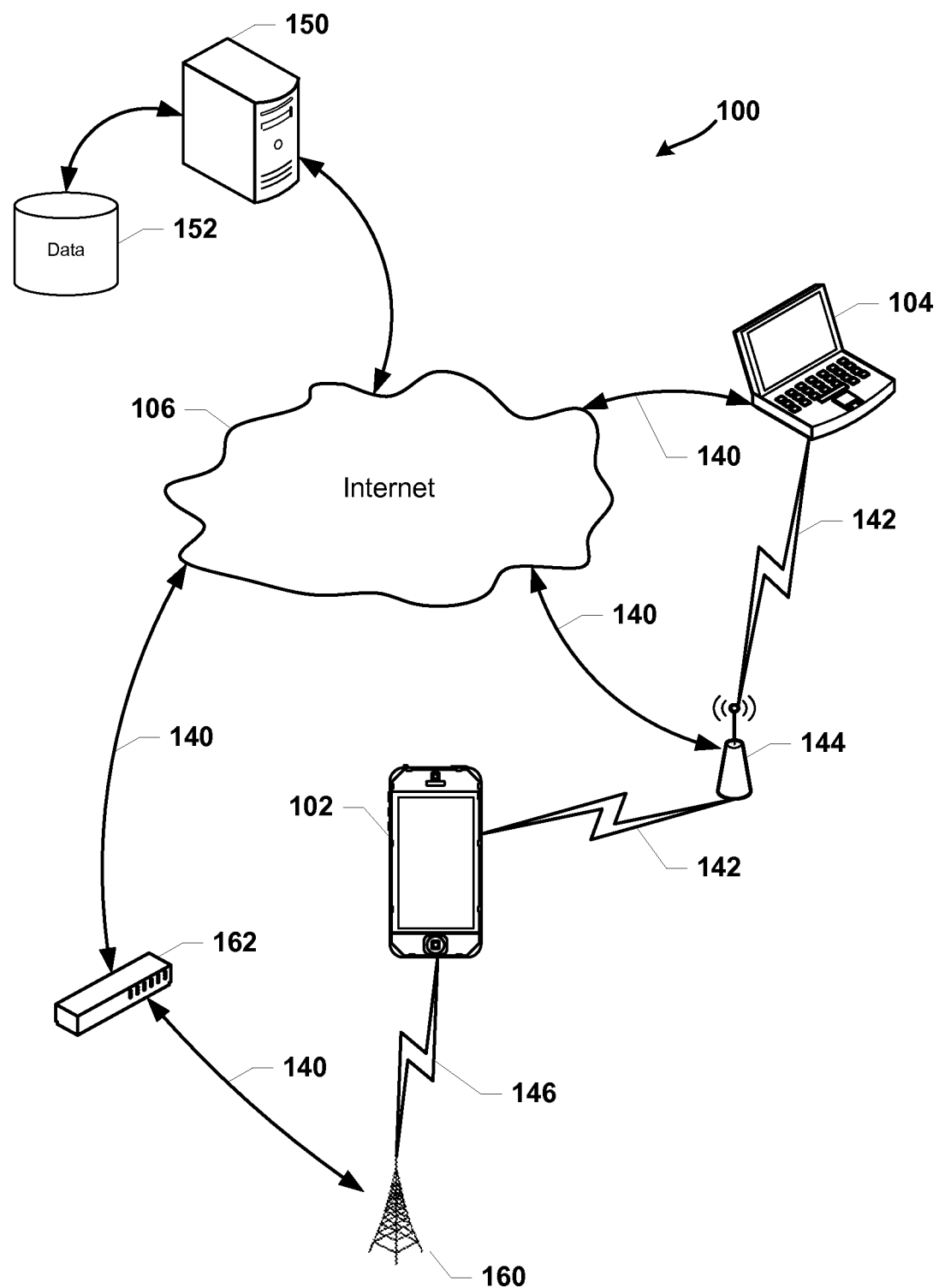
FIG. 1 is a communication system block diagram of VoIP networks suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "receiver device" refers to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which individually include a programmable processor, a buffer memory, and circuitry for connecting to a communication network. The various aspects may be useful in mobile computing devices, such as smart phones, and so such devices are referred to in the descriptions of the various embodiments. However, the embodiments may be useful in any electronic devices configured to receive data packets via a VoIP communication system.

VoIP typically functions as a best-effort protocol without fundamental Quality of Service (QoS) guarantees, and communication on an IP network is often less reliable than other networks (e.g., circuit-switched public telephone networks) because VoIP does not provide a network-based mechanism to ensure that data packets are received on the receiving device or delivered in sequential order. Thus, VoIP implementations may suffer "choppy" playback that occurs when some media packets are unavailable for playback because media packets are lost in transit from the originating device and/or because the receiving device has rejected the media packets upon arrival.

A conventional VoIP receiving device does not keep track of the media packets that it has rejected or failed to buffer. Consequently on occasion the receiver device may reject some more media packets received in the future unnecessarily, which can contribute to poor voice quality. In other words, a conventional receiver device may unnecessarily reject a new packet because the processor expects to receive another packet that the processor has already rejected. For example, the receiver device may have a buffer that holds five packets, but the receiver device may receive a burst of ten packets (sequentially ordered 1 to 10). In this case, the receiver device might buffer packets 1-5 and reject packets 6-10 because the buffer is too small to store all ten packets at the same time. When the receiver device receives packet 11 (i.e., the next packet in the sequence because packets 6-10 were rejected), the receiving device will needlessly reject packet 11 because the receiver device processor expects to receive packet 6, which it has rejected. This may happen even when play-out of buffered packets has freed up room in the buffer sufficient to store packet 11.

To address these and other limitations of current packet buffer management processes, the various embodiments include methods implemented by a processor of a VoIP receiver device (referred to herein as a "receiver device processor") for managing media packet rejections on the receiving device to improve audio playout. In overview, the embodiment methods may enhance the likelihood that a receiver device will buffer (rather than reject) an incoming media packet by maintaining a history of previously rejected media packets (i.e., a packet rejection history) and referencing the packet rejection history when determining whether to reject or to accept an incoming packet the receiver device has just received. Thus, the various embodiments may reduce gaps in playback by avoiding unnecessary packet rejections, thereby improving playout sound quality.

In an embodiment, the receiver device processor may keep track of the packets it rejects with a packet rejection history and may use the packet rejection history to identify how much space is actually needed in the buffer to store an incoming packet. Specifically, the receiver device processor may use the packet rejection history to avoid saving space in the buffer for packets that have been rejected (i.e., previously received and not stored in the buffer), thereby freeing up more space in the buffer for storing incoming packets. In this regard, the term "last-buffered packet" refers to the last packet that was stored in the buffer, which may serve as a reference point in the buffer when determining whether to accept or reject an incoming packet in the various embodiments.

In another embodiment, the receiver device processor may also manage the packet rejection history to ensure that the packet rejection history only includes entries for rejected packets that have sequence numbers that exceed the sequence number of the packet currently being played. Thus, the receiver device processor may continually update the packet rejection history to keep the number of entries manageable and to make sure that the entries are relevant to determining whether there is sufficient space in the buffer to store incoming packets.

The embodiment methods may be implemented in software and executed by the receiver device processor, which may be any processing unit—such as a CPU, DSP, logic circuit, etc.—included in the receiver device. The receiver device processor may implement the packet rejection history in various data structures. For example, the packet rejection history may be implemented as a look-up table or hashtable. In another example, the packet rejection history may be a circular hashtable in which the first entry in the circular hashtable at any given time is the first media packet rejected after the packet currently being played out.

FIG. 1 illustrates a network system 100 suitable for use with the various embodiments. The network system 100 may include multiple receiver devices 102, 104, which may include smart phones, personal computers, and/or laptop computers.

In an embodiment, a first receiver device 102 and second receiver device 104 may be configured to receive packets (e.g., VoIP data packets) from a network such as the Internet 106 via wireless connections 142 established through a wireless access point 144. The wireless access point 144 may connect with the Internet 106 through a wired connection 140. In another embodiment, the first receiver device 102 may receive packets via a cellular connection 146 (e.g., CDMA, TDMA, GSM, PCS, 3G, 4G, LTE, etc.) with a cellular tower or base station 160. The cellular tower or base station 160 may be in communication with a router 162 which may connect to the Internet 106. In another embodiment, the second receiver device 104 may receive data packets via a wired connection 140 to the Internet 106.

In an embodiment, the first and second receiver devices 102, 104 may receive data packets that originate from other receiver devices and/or from servers, such as VoIP server 150. The VoIP server 150 may be configured to manage and deliver data packets via a connection to the Internet 106 and may be configured to have access to a database 152.

Figure 2:
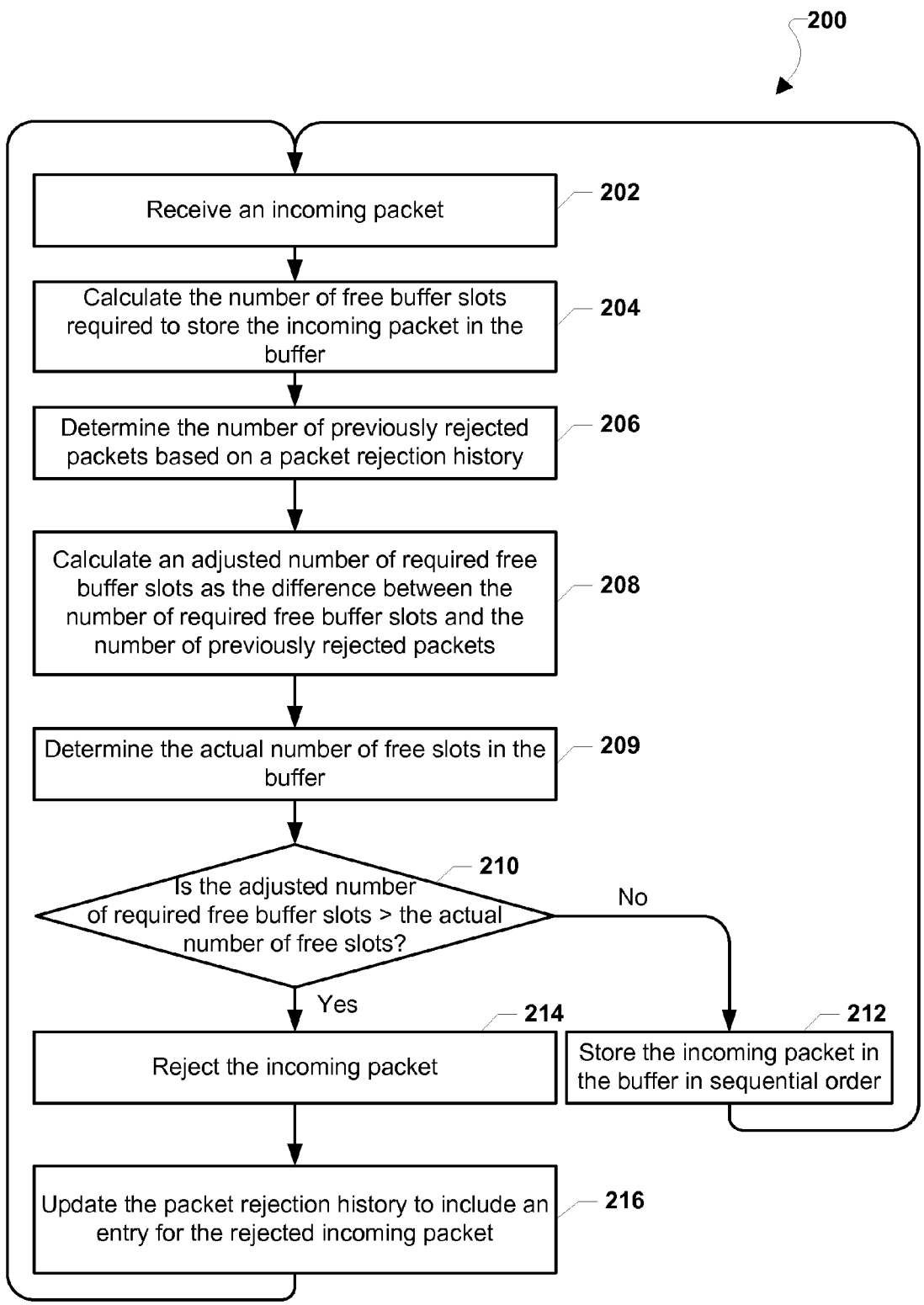
FIG. 2 is a process flow diagram of an embodiment method for managing a packet buffer.

FIG. 2 illustrates an embodiment method 200 that may be implemented on a receiver device processor for improve media playout from a buffer by utilizing a packet rejection history. In contrast to conventional methods of buffer management, the operations of method 200 may enable the receiver device processor to allocate space in the playout buffer for incoming packets more effectively by accounting for previously rejected packets that the device will never store in the buffer.

In an embodiment, the receiver device may receive an incoming packet in block 202, such as directly from an originating device or from a server (e.g., VoIP server 150 described above with reference to FIG. 1). As described above, media packets include metadata—including sequence numbers—that enables a receiver device processor to determine the order in which the media packet should be played to ensure coherent playout.

In some circumstances, the receiver device may receive an incoming packet out of order because of delay in delivering packets earlier in the sequence. For example, in a sequence of seven packets the receiver device may receive and store the seventh packet before receiving the fifth packet in the sequence. In other circumstances, an incoming packet may be included as part of a burst of packets, (i.e., a series of more than one packet received within a short period of time), and the receiver device may process the packets in the burst one at a time in the order of their arrival.

In block 204, the receiver device processor may calculate the number of free buffer slots required to store the incoming media packet in the buffer. In an embodiment, the receiver device may include a buffer of a finite size that includes indexed slots for storing media packets. Because buffered media packets should be played in sequential order, the receiver device processor may store media packets in the buffer in sequential order. For example, a fourth packet in a sequence may be stored in a slot in the buffer after a buffer slot storing a third packet in the sequence and before the buffer slot storing the fifth packet in the sequence. Thus, in block 204, the receiver device processor may calculate the number of required free buffer slots as the number of buffer slots after the buffer slot storing the last-buffered packet required to store the incoming packet in order to preserve the sequential order. The operations performed in block 204 are further described below with reference to FIG. 3.

The receiver device processor may determine the number of previously rejected packets since the last-buffered packet based on a packet rejection history in block 206. In this operation, the receiver device processor may count the number of rejected packets in the packet rejection history that have sequence numbers between the sequence number of the last-buffered packet and the sequence number of the incoming packet. The number of rejected packets may indicate the number of slots in the buffer that are additionally available for storing incoming packets as further described below with reference to FIG. 4.

In block 208, the receiver device processor may calculate an adjusted number of free buffer slots required to store the incoming packet in the buffer as the difference between the required free buffer slots calculated in block 204 and the number of previously rejected packets determined in block 206. Specifically, because one or more packets may have been received and rejected between the last-buffered packet and the incoming packet, the number of free buffer slots needed to store the incoming packet may be less than the number of required free buffer slots calculated in block 204. For example, the receiver device may only need one free buffer slot to store packet 5 between packet 3 and packet 6 when the processor has previously rejected packet 4. As another example, the receiver device may only need one free buffer slot to store packet 6 after packet 3 when the processor has previously rejected packets 4 and 5. The receiver device processor may also determine the actual number of free slots in the buffer in block 209 using known methods.

In determination block 210, the receiver device processor may determine whether the adjusted number of required free buffer slots calculated in block 208 exceeds the actual number of free slots in the buffer determined in block 209 in order to assess whether the buffer has sufficient space to store the incoming packet. In other words, the receiver device processor may assess whether there is enough space available to store the incoming packet in the buffer after discounting previously rejected packets.

When the receiver device processor determines that the adjusted number of required free slots exceeds the actual number of free slots in the buffer (i.e., determination block 210="Yes"), the processor may reject the incoming packet in block 214. In this event, the buffer may be full, such as when the rate of playout is slower than the rate in which the receiver device receives incoming packets. In another embodiment, the buffer may not be full, but the receiver device processor may still reject the incoming packet because the processor may anticipate receiving other packets out of order and may be saving slots in the buffer for those out-of-order packets.

After rejecting the incoming packet in block 214, the receiver device processor may update the packet rejection history to include an entry for the rejected incoming packet in block 216. In other words, the receiver device processor may keep an ongoing record of the packets that it has rejected. In an embodiment, the receiver device processor may update the packet rejection history to reflect the current state of the buffer, such as by changing the pointers in a packet rejection history and/or by recording that the incoming packet was rejected in a lookup table or circular buffer.

When the receiver device processor determines that the adjusted number of required free buffer slots does not exceed the actual number of free slots in the buffer (i.e., determination block 210="No"), the receiver device processor may store the incoming packet in the buffer in sequential order in block 212. In an embodiment, by performing the above operations, the receiver device processor may store the incoming packet in the buffer while leaving free slots in the buffer for storing out-of-order packets that may arrive later.

In another embodiment, the adjusted number of required free buffer slots may also represent the index/location of a slot in the buffer relative to the last-buffered packet's slot, and the receiver device processor may store the incoming packet in a buffer slot associated with that slot index as further described below with reference to FIG. 5. For example, the last-buffered packet may have a sequence number of 5. If the receiver device receives an incoming packet with a sequence number of 8 and determines that the adjusted number of required free slots in the buffer is two, the processor may store the incoming packet in a buffer slot that is two slots after the last-buffered packet's slot.

In an embodiment, after either updating the rejection history to include an entry for the rejected incoming packet in block 216 or storing the incoming packet in the buffer in block 212, the receiver device processor may repeat the operations described above for subsequent incoming packets, thereby improving media playout by creating a higher likelihood that the receiver device stores (instead of rejects) each incoming packet in the buffer.

Figure 3:
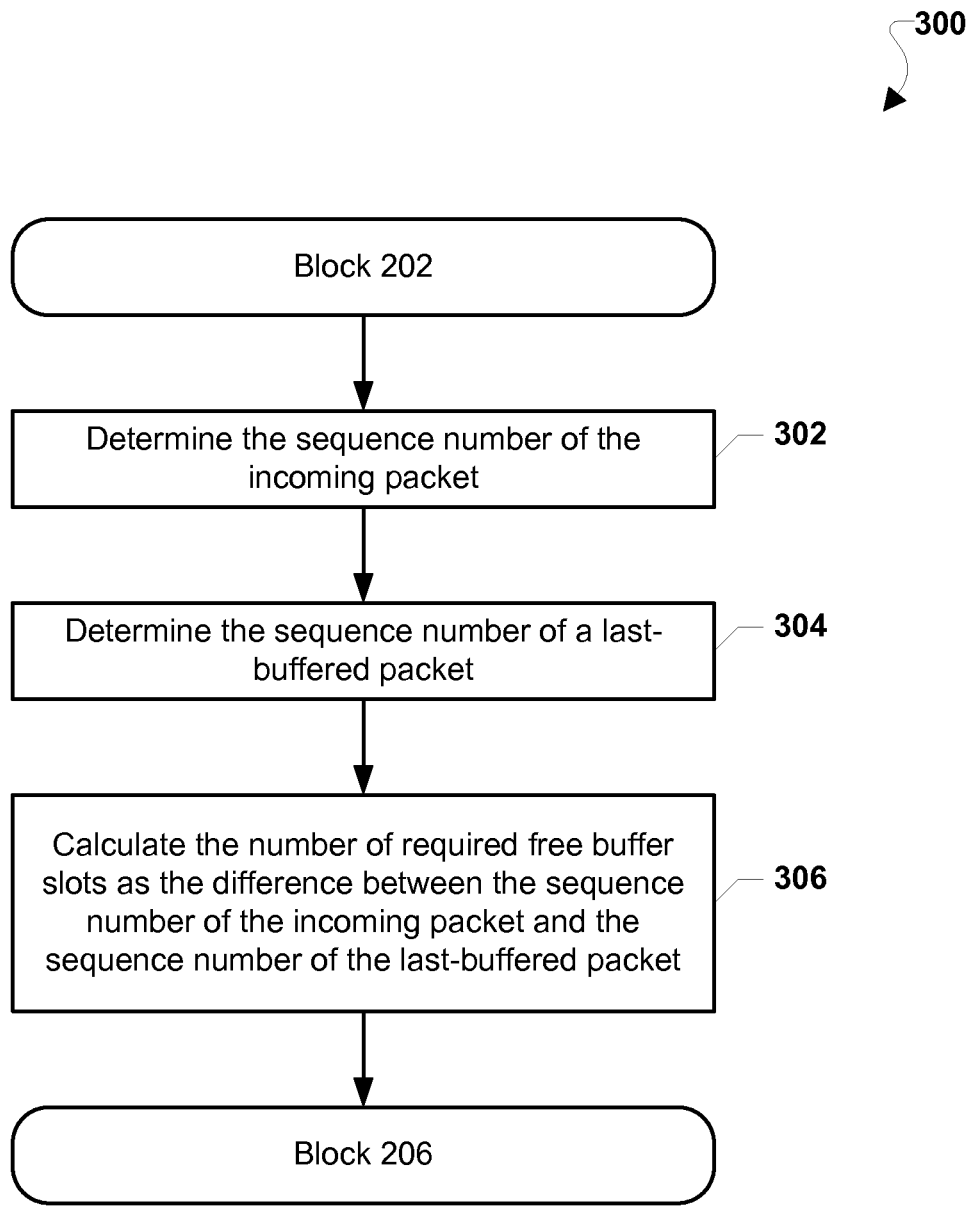
FIG. 3 is a process flow diagram of an embodiment method for calculating the number of free buffer slots required to store an incoming packet in a buffer.

FIG. 3 illustrates an embodiment method 300 that may be implemented on a receiver device processor for calculating the number of free buffer slots required to store an incoming packet in the device's playout buffer. The operations of method 300 may implement an embodiment of the operations of block 204 of method 200 described above with reference to FIG. 2.

After receiving an incoming packet in block 202 of method 200, the receiver device processor may determine the sequence number of the incoming packet in block 302. As described above, the incoming packet may include metadata including the packet's sequence number. The receiver device processor may also determine the sequence number of a last-buffered packet in block 304 using similar techniques.

The receiver device processor may calculate the number of required free buffer slots to store the incoming packet as the difference between the sequence number of the incoming packet and the sequence number of the last-buffered packet in block 306. In an embodiment, this calculation may produce an index value for a buffer slot relative to the last-buffered packet to which the incoming packet must be stored to preserve the sequential order in the buffer. For example, when the last-buffered packet has a sequence number of 12 and the incoming packet has a sequence number of 15, the incoming packet may need to be stored in a buffer slot that has an index that is three more (e.g., 15−12=3) than the slot index of the last-buffered packet in order to save room for packets 13 and 14.

However, as described above with reference to FIG. 2, the number of required free buffer slots may be an inaccurate representation of the number of buffer slots actually needed to store the incoming packet when intervening packets have been rejected, because the number of required buffer slots may factor in out of sequence packets that have not been received because they were rejected and, therefore, do not need a buffer slot saved for them. To account for such previously rejected packets, the receiver device processor determine the number of previously rejected packets in block 206 of method 200 as described above with reference to FIG. 2.

Figure 4:
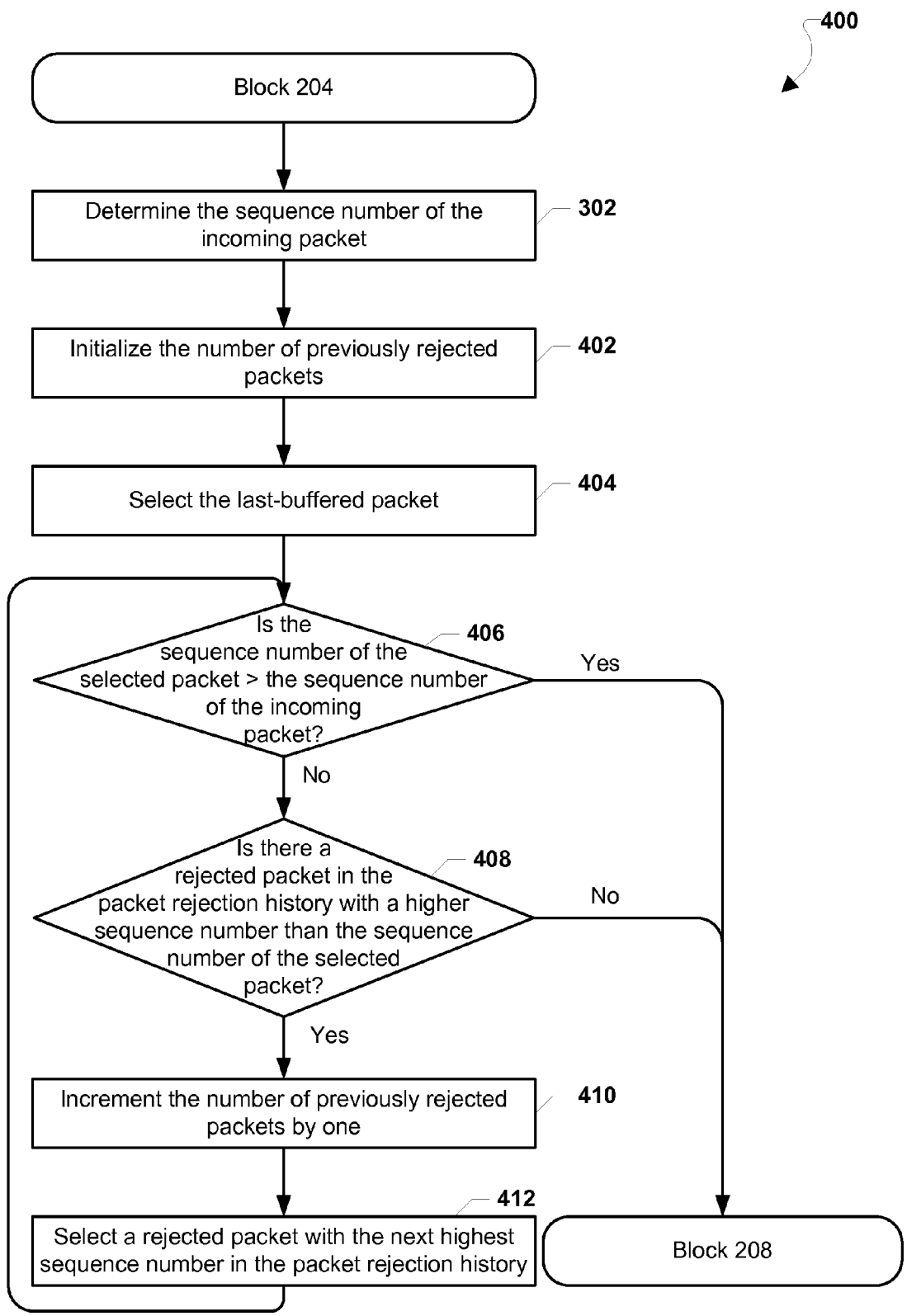
FIG. 4 is a process flow diagram of an embodiment method for determining a number of previously rejected packets in a packet rejection history.

FIG. 4 illustrates an embodiment method 400 that may be implemented on a receiver device processor for determining the number of packets rejected after the last-buffered packet in sequential order. The operations of method 400 may implement an embodiment of the operations of block 206 of method 200 described above with reference to FIG. 2. The receiver device processor may begin performing method 400 after calculating the number of free slots in the buffer required to store the incoming packet in block 204 of method 200.

In block 302, the receiver device processor may determine the sequence number of the incoming packet, as described above with reference to FIG. 3. The receiver device processor may also initialize the number of previously rejected packets in block 402. In an embodiment, the receiver device processor may utilize the number of previously rejected packets as a counter while traversing the packet rejection history, and thus may initially set the number of previously rejected packets to be equal to zero. The receiver device processor may also use the number of previously rejected packets to adjust the number of required free buffer slots (as described above with reference to FIG. 2) to account for packets that have been rejected (i.e., packets that will never be stored in the buffer).

The receiver device processor may begin counting the number of previously rejected packets in the packet rejection history by selecting the last-buffered packet in block 404. In an embodiment, the receiver device processor may traverse the packet rejection history starting from the last-buffered packet's sequence number and count the number of packets that have been rejected between the last-buffered packet and the incoming packet based on the packets' sequential order.

In determination block 406, the receiver device processor may determine whether the sequence number of the selected packet exceeds the sequence number of the incoming packet as determined in block 302. In an embodiment, the receiver device processor may make this determination to identify when it has finished counting previously rejected packets with sequence numbers between those of the last-buffered packet and the incoming packet.

When the receiver device processor determines that the sequence number of the selected packet exceeds the sequence number of the incoming packet (i.e., determination block 406="Yes"), the process may calculate the adjusted number of required free buffer slots in block 208 of method 200 as described above with reference to FIG. 2. In an example, the receiver device processor may make such a determination when the incoming packet has a sequence number less than the sequence number of the last-buffered packet (e.g., when the incoming packet is received out of order) or when the processor has selected a rejected packet that has a sequence number that exceeds the incoming packet's sequence number.

When the receiver device processor determines that the sequence number of the selected packet does not exceed the sequence number of the incoming packet (i.e., determination block 406="No"), the processor may determine whether there is a rejected packet in the packet rejection history with a higher sequence number than the sequence number of the selected packet in determination block 408. In other words, the receiver device processor may determine whether there are more rejected packets in the packet rejection history between the last-buffered packet and the incoming packet to count.

When the receiver device processor determines that there are no rejected packets in the packet rejection history with a higher sequence number than the sequence number of the selected packet (i.e., determination block 408="No"), the processor may calculate the adjusted number of required free buffer slots in block 208 of method 200 as described above with reference to FIG. 2 because there may be no more rejected packets in the packet rejection history to count between the last-buffered packet and the incoming packet.

When the receiver device processor determines that there is a rejected packet in the packet rejection history with a higher sequence number than the sequence number of the selected packet (i.e., determination block 408="Yes"), the processor may increment the number of previously rejected packets by one in block 410, thereby keeping count of the total number of rejected packets between the last-buffered packet and the incoming packet. The receiver device processor may also select a rejected packet with the next highest sequence number in the packet rejection history in block 412 and may continue performing the above operations until the sequence number of the selected packet exceeds the sequence number of the incoming packet (i.e., determination block 406="Yes") or until there are no more rejected packets in the rejection packet history left to select (i.e., determination block 408="No").

Figure 5:
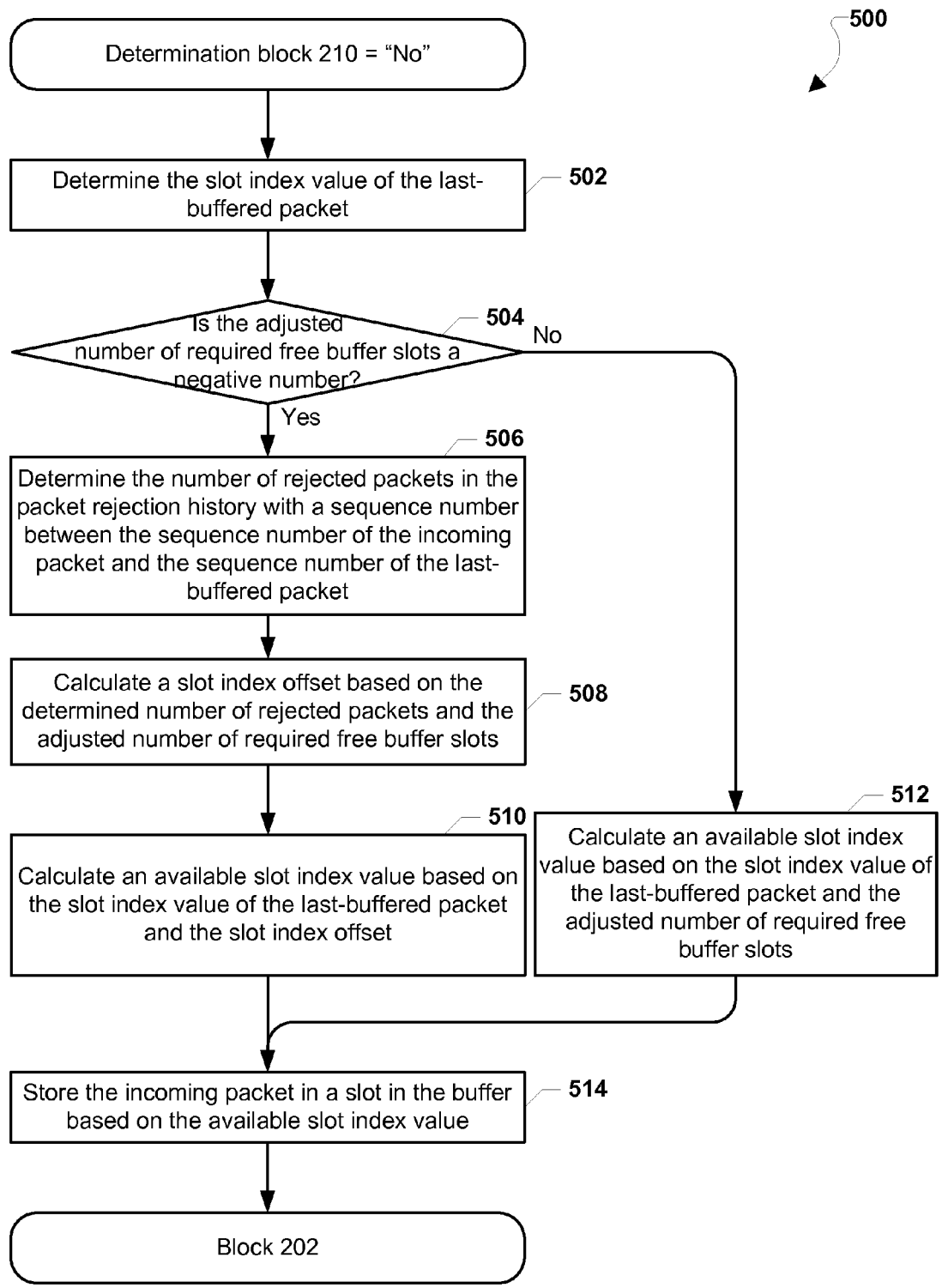
FIG. 5 is a process flow diagram of an embodiment method for storing an incoming packet in a buffer.

FIG. 5 illustrates an embodiment method 500 that may be implemented on a receiver device processor for storing an incoming packet in the buffer. The operations of method 500 implement an embodiment of the operations of block 212 of method 200 described above with reference to FIG. 2, and the receiver device processor may begin performing method 500 after determining in method 200 that the adjusted number of required free buffer slots does not exceed the actual number of free slots in the buffer (i.e., determination block 210="No").

In block 502, the receiver device processor may determine the slot index value of the last-buffered packet, which the processor may have stored as a value or pointer in memory. In other words, the receiver device processor may determine the location in the buffer in which the last-buffered packet is stored. In an embodiment, the slot index of the last-buffered packet may be a reference point by which the receiver device processor determines the slot in the buffer in which to insert an incoming packet as described below.

In determination block 504, the receiver device processor may determine whether the adjusted number of required free buffer slots is a negative number. The adjusted number of required free buffer slots may be a negative number when packets are received out of order such that the sequence number of the incoming packet is less than the sequence number of the last-buffered packet (e.g., when the receiver device receives the incoming packet out of order). In an embodiment, a negative adjusted number of required free buffer slots may indicate that the incoming packet should be stored in an earlier slot in the buffer than the last-buffered packet in order to enable sequential playout of packets, while a non-negative adjusted number of required free slots may indicate that the incoming packet should be stored in a later slot in the buffer.

When the receiver device processor determines that the adjusted number of required free buffer slots is a positive number (i.e., determination block 504="No"), the processor may calculate an available slot index value based on the slot index value of the last-buffered packet and the adjusted number of required free buffer slots in block 512. In an embodiment, the available slot index may be the slot in the buffer in which the incoming packet should be stored to preserve the sequential order of the packets in the buffer. For example, when the adjusted number of required free buffer slots is four, the available slot index may point to a slot that is four buffer slots after the last-buffered packet's slot. Further, since the actual number of required free buffer slots accounts for packets that have been rejected, the receiver device processor may insert incoming packets into the buffer without saving space for packets that have been rejected. In block 514, the receiver device processor may also store the incoming packet in the buffer based on the available slot index calculated in block 512.

When the receiver device processor determines that the adjusted number of required free buffer slots is a negative number (i.e., determination block 504="Yes"), the processor may determine the number of rejected packets in the packet rejection history between the incoming packet and the last-buffered packet in block 506. In an embodiment, the receiver device processor may traverse through the packet rejection history in a manner similar to the one described above with reference to FIG. 4, such as by counting the number of rejected packets in the packet rejection history with sequence numbers higher than the incoming packet's sequence number and lower than the last-buffered packet's sequence number.

The receiver device processor may also calculate a slot index offset based on the determined number of rejected packets and the adjusted number of required free buffer slots in block 508. In an embodiment, the slot index offset may represent the number of slots before the buffer slot storing the last-buffered packet of the appropriate buffer slot in which to store the incoming packet. For example, when the incoming packet's sequence number is 10 and the last-buffered packet's sequence number is 15, the adjusted number of required free buffer slots may be −5 (i.e., −5=10−15). However, if packets 12 and 14 were previously rejected (i.e., when there are two rejected packets between the incoming packet and the last-buffered packet), the receiver device processor may not need to reserve space for packets 12 and 14. Thus, the processor may account for the rejected packets when determining the slot location within the buffer in which to store the incoming packet.

Thus to account for any rejected packets, in block 510 the receiver device processor may calculate an available slot index value based on the slot index value of the last-buffered packet as determined in block 502 and the slot index offset as determined in block 506. In an embodiment, the available slot index may be the index value of the buffer slot in which the receiver device processor should store the incoming packet to preserve sequential order as described above with reference to block 512. In the above example, the slot index offset may be "−3" (i.e., −3=2 rejected packets+−5), indicating that the incoming packet should be stored in a buffer slot that is three slots before the buffer slot in which the last-buffered packet is stored. The receiver device processor may store the incoming packet in a slot in the buffer based on the available slot index in block 514, and continue receiving incoming packets in block 202 of method 200 as described above with reference to FIG. 2.

Figure 6:
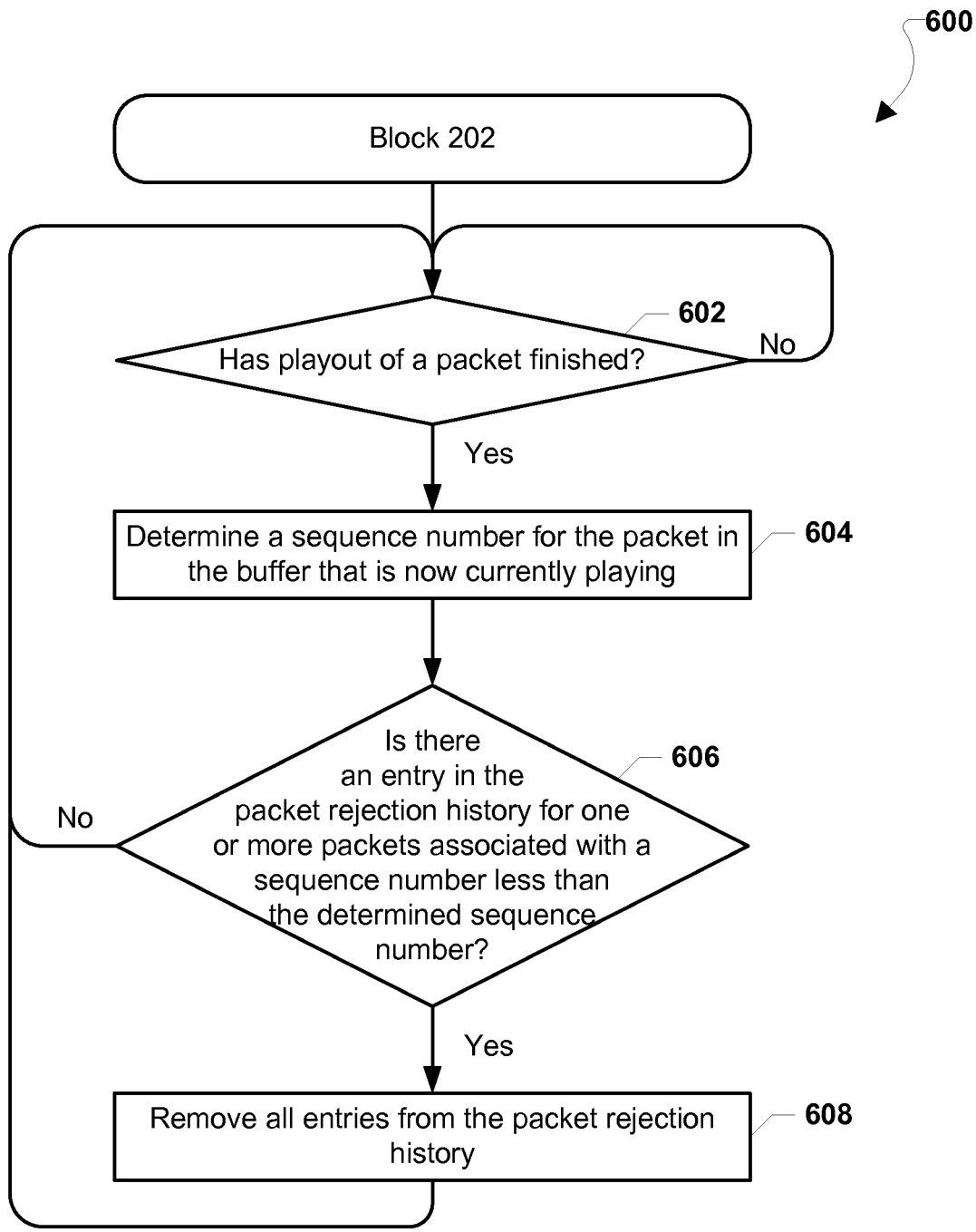
FIG. 6 is a process flow diagram of an embodiment method for managing a packet rejection history.

FIG. 6 illustrates an embodiment method 600 that may be implemented on a receiver device processor for managing a packet rejection history. The operations of method 600 may be a further embodiment of the operations of method 200 described above with reference to FIG. 2. In an embodiment, the receiver device processor may perform the operations of method 600 to keep the packet rejection history up to date and to ensure that the packet rejection history is a manageable size by removing entries that may no longer be relevant to the management of the buffer. The receiver device processor may begin performing method 600 after receiving an incoming packet in block 202 of method 200.

In determination block 602, the receiver device processor may determine whether playout of a packet has finished. For instance, the receiver device processor may monitor a packet's playout progress, such as the amount of play time remaining or the number of bytes left to play out. When the receiver device processor determines that the packet has not finished playout (i.e., determination block 602="No"), the processor may continue performing the operations in determination block 602 until the processor recognizes that playout of the packet has finished.

When the receiver device processor determines that the packet has finished playing (i.e., determination block 602="Yes"), the processor may determine the sequence number of the packet in the buffer that is currently playing. For example, the receiver device processor may reference a playlist that includes the identity of the packets in the buffer, as well as their sequence number/playing order.

The receiver device processor may also determine whether there are any (i.e., one or more) entries in the packet rejection history associated with one or more packets that have a sequence number less than the determined sequence number in determination block 606. In an embodiment, the receiver device processor may use the currently playing packet's sequence number to mark an exclusive starting boundary of the packet rejection history because information regarding packets sequentially before the currently playing packet may be irrelevant to whether incoming packets should be accepted or rejected. Thus, the receiver device processor may maintain the packet rejection history to include entries only for rejected packets with sequence numbers greater than the currently playing packet's sequence number. In another embodiment, as mentioned above, the receiver device processor may ensure that the first entry in the packet rejection history is always the rejected packet that is closest in sequential order to the packet currently being played.

When then receiver device processor determines that there no entries in the packet rejection history for one or more packets associated with a sequence number less than the determined sequence number (i.e., determination block 606="No"), the receiver device processor may repeat the process by again determining whether playout of the current packet has finished in determination block 602.

When then receiver device processor determines that there is at least one entry in the packet rejection history for one or more packets associated with a sequence number less than the determined sequence number (i.e., determination block 606="Yes"), the processor may remove all entries from the packet rejection history in block 608. In an embodiment, the receiver device processor may traverse the packet rejection history, starting with the first entry, and may remove entries associated with rejected packets having sequence numbers less than the currently playing packet's sequence number. The receiver device processor may then repeat the process by again determining whether playout of the current packet has finished in determination block 602.

Figure 7A:
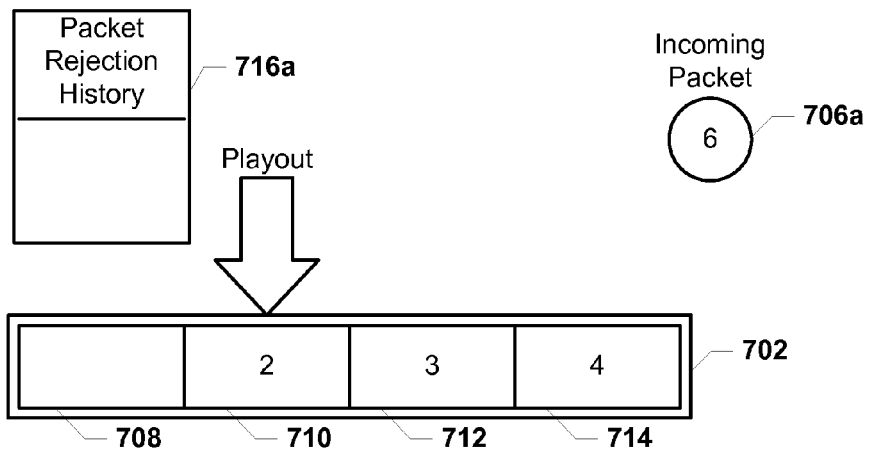
FIGS. 7A-7C are diagrams illustrating examples of accepting or rejecting incoming packets by referencing the current state of a buffer and a packet rejection history.
Figure 7B:
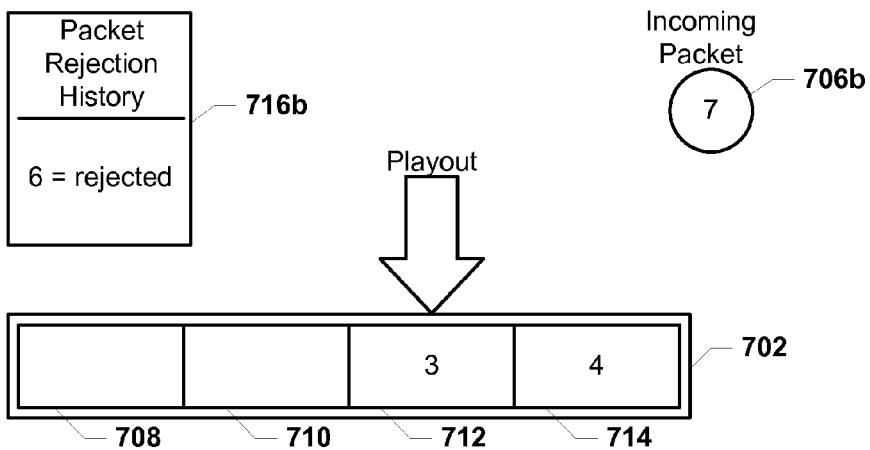
Figure 7C:
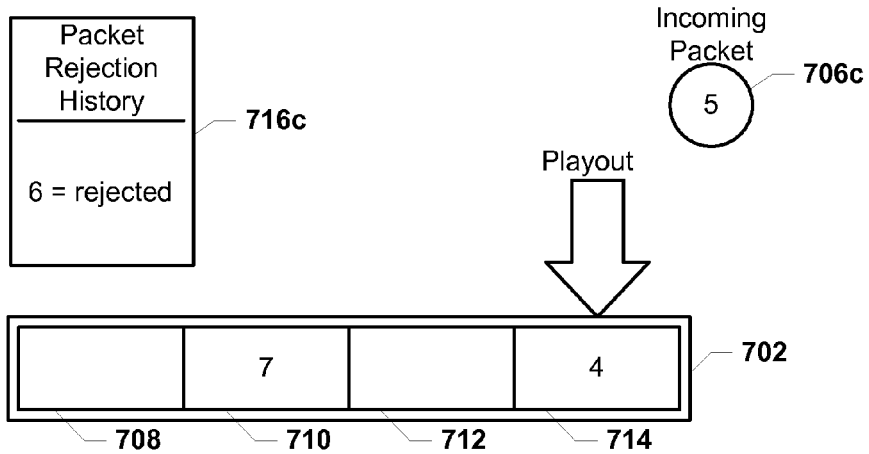

FIGS. 7A-7C illustrate examples of managing buffer space on an embodiment receiver device over a period of time by utilizing a packet rejection history. For ease of describing the process of managing packets in a buffer in the examples illustrated in FIGS. 7A-7C, packets are labeled with their sequence number. For example, "packet 8" represents the eighth packet in a sequence of packets.

FIG. 7A illustrates an example of buffer management in which the receiver device receives and rejects an incoming packet 6 706a. As illustrated in FIG. 7A, the receiver device may have previously received, accepted, and stored media packets 2, 3, and 4 sequentially in slots 710, 712, 714 of the buffer 702.

When incoming packet 6 706a arrives during playout of packet 2, the receiver device processor may determine whether there is room in the buffer to store the packet (i.e., whether to accept or reject the incoming packet 706a). As described above, the receiver device processor may determine that packet 4 was the last packet added to the buffer 702, and based on that determination, may determine that two free buffer slots are required to store the incoming packet 6 706a: one buffer slot for packet 5 (an out-of-order packet) and another buffer slot for the incoming packet 6 706a.

In an embodiment, the receiver device processor may check the packet rejection history 716a to determine the number of packets that have been rejected since packet 4 was added (i.e., the number of buffer slots that are actually needed to store the incoming packet 6 706a). As illustrated in FIG. 7A, when the packet rejection history 716a has no entries, the receiver device processor determines that no packets have been rejected since packet 4 was accepted, so the adjusted number of required free buffer slots will remain two (2=2−0): one free buffer slot for packet 5, should it arrive; and one free buffer slot for incoming packet 6 706a. In this situation, because the adjusted number of required free buffer slots (i.e., two) exceeds the actual number of free slots in the buffer (i.e., one), the receiver device processor may reject incoming packet 6 706a and update the packet rejection history 716a to record the rejection of incoming packet 6 706a as illustrated in packet rejection history 716b in FIG. 7B.

FIG. 7B continues the example with reception of the next packet, which is incoming packet 7 706b. In the example illustrated in FIG. 7B, the receiver device has finished playing out packet 2, thereby freeing up buffer slot 710. Thus, the buffer 702 now has two available (i.e., free) slots when incoming packet 7 706b arrives.

Upon receiving the next incoming packet 7 706b, the receiver device processor determines from the packet's sequence number (7) and the sequence number of the last-buffered packet (4) that the number of free buffer slots required to store incoming packet 7 706b is three (i.e., packet 7−packet 4=3 free buffer slots required). The receiver device processor again checks the packet rejection history 716b to determine the number of packets that have been rejected between packet 4 and the incoming packet 7 706b. In this case, based on the packet rejection history 716b, the receiver device processor determines that there was one rejection (i.e., packet 6) between packet 4 and the incoming packet 7 706b. Based on this information, the receiver device processor calculates that adjusted number of required free buffer slots is two because packet 6 has already been rejected, meaning that the buffer 702 only needs two buffer slots: one to store packet 5, should it ever arrive; and one to store the incoming packet 7 706b. The receiver device processor may then determine that the buffer 702 has room to store incoming packet 7 706b because buffer slots 708, 710 are free.

After determining that there is room in the buffer to store the incoming packet 7 706b, the receiver device processor may store the incoming packet 7 706b in the buffer in a slot off set from the slot storing the last-buffered packet based on the adjusted number of required free buffer slots calculated above (i.e., 2). Thus, the receiver device processor may store the incoming packet 7 706b in buffer slot 710 because buffer slot 710 is two slots in the buffer after packet 4's slot (i.e., buffer slot 714), thereby keeping the buffer in sequential order.

FIG. 7C continues the example with reception of the next packet, which is incoming packet 5 706c that is received out of order. In the example illustrated in FIG. 7C, the receiver device has finished playing packet 3 in buffer slot 712, thereby freeing up buffer slot 712, and begun playout of packet 4 stored in buffer slot 714.

When the incoming packet 5 706c arrives, the receiver device processor determines from the packet's sequence number (5) and the sequence number of the last-buffered packet (7) that the number of free buffer slots required to store incoming packet 5 706c is −2 (i.e., packet 5−packet 7=−2). As described above with reference to FIG. 5, when a packet arrives out of order (i.e., after a packet with a higher sequential number is stored in the buffer), the receiver device processor may have already left space in the buffer for that out-of-order packet. Thus, in the example illustrated in FIG. 7B, the receiver device processor left room in the buffer 702 for incoming packet 5 706c when storing incoming packet 7 706b in the buffer 702.

In an embodiment, to determine slot of the buffer 702 in which to store the incoming packet 5 706c, the receiver device processor may adjust the number of required free buffer slots to account for the rejected packets between incoming packet 5 706c and the last-buffered packet 7 (i.e., the last packet added to the buffer). By checking the packet rejection history 716c, the receiver device processor determines that one packet (i.e., packet 6) was rejected and may add one to the number of required free buffer slots to generate a slot index offset of −1 (i.e., −2 required free buffer slots+1 rejected packet=−1). The slot index offset of −1 may be used by the receiver device processor to determine that incoming packet 5 706c should be stored in buffer slot 708, because buffer slot 708 is one slot before buffer slot 710 in which the last-buffered packet (i.e., packet 7) is stored.

Figure 8:
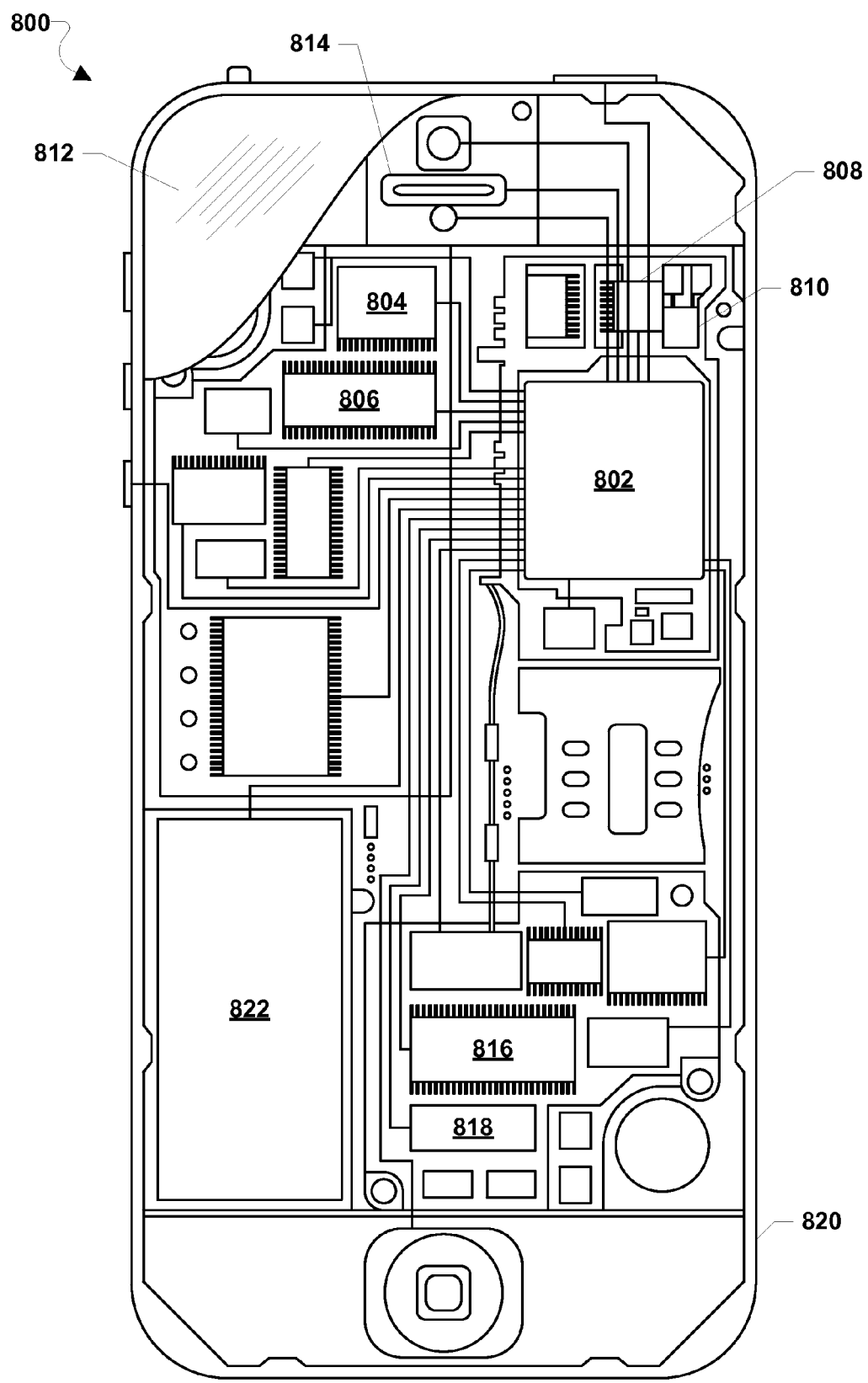
FIG. 8 is a component block diagram of an example receiver device according to an embodiment.

The various embodiments may be implemented in any of a variety of mobile computing devices, an example of which is illustrated in FIG. 8. The mobile computing device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile computing device 800 need not have touch screen capability.

The mobile computing device 800 may have one or more radio signal transceivers 808 (e.g., Peanut, Bluetooth, Zigbee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor.

The mobile computing device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components discussed herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

The mobile computing device 800 may also include a SIM card 830 that utilizes a cellular telephone transceiver 808 and one or more antennae 810 to connect to a mobile network. While not shown, in further embodiments, the mobile computing device 800 may be a multi-SIM communication device and may include additional SIM cards that utilize one or more cellular telephone transceivers 808 to respectively connect to additional mobile networks.

Figure 9:
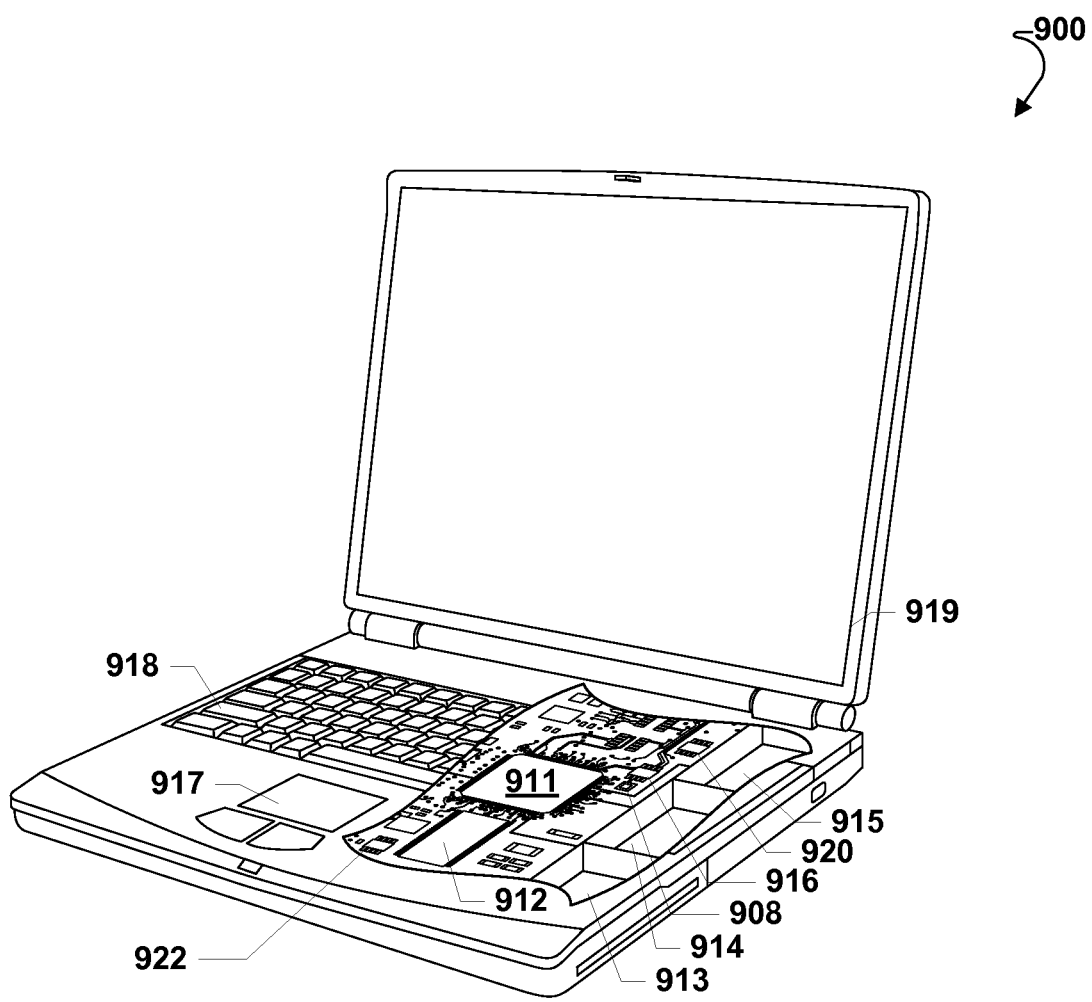
FIG. 9 is a component block diagram of another receiver computing device according to an embodiment.

The various embodiments described above may also be implemented within a variety of mobile communication devices, such as a laptop computer 900 illustrated in FIG. 9. Many laptop computers include a touchpad touch surface 917 that serves as the computer's pointing device, and thus may receive drag, scroll, and flick gestures similar to those implemented on mobile computing devices equipped with a touch screen display and described above. A laptop computer 900 may include a processor 911 coupled to volatile memory 912 and a large capacity nonvolatile memory, such as a disk drive 913 of Flash memory. Additionally, the computer 900 may have one or more antenna 908 for sending and receiving electromagnetic radiation that may be connected to a wireless data link and/or cellular telephone transceiver 916 coupled to the processor 911. The computer 900 may also include a floppy disc drive 914 and a compact disc (CD) drive 915 coupled to the processor 911. In a notebook configuration, the computer housing includes the touchpad 917, the keyboard 918, and the display 919 all coupled to the processor 911. Other configurations of the computing device may include a computer mouse or trackball coupled to the processor (e.g., via a USB input) as are well known, which may also be use in conjunction with the various embodiments. The computer 900 may have a SIM card 920 that utilizes a cellular telephone transceiver 916 and one or more antennae 908 to connect to a first and a second mobile network, respectively. While not shown, in further embodiments, the mobile communication device 900 may be a multi-SIM communication device and may include additional SIM cards that utilize one or more cellular telephone transceivers 916 to connect to additional mobile networks.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium (i.e., stored processor-executable software instructions). The steps of a method or algorithm disclosed herein may be embodied in a processor-executable software module and may be performed as processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing media packet playback on a voice over Internet protocol (VoIP) receiver device comprising a buffer, comprising:

calculating a number of free buffer slots required to store an incoming packet in the buffer;
determining a number of previously rejected packets based on a packet rejection history;
calculating an adjusted number of required free buffer slots as a difference between the number of required free buffer slots and the number of previously rejected packets;
determining a number of free slots in the buffer;
determining whether the adjusted number of required free buffer slots exceeds the number of free slots in the buffer;
rejecting the incoming packet and updating the packet rejection history to include an entry for the rejected incoming packet in response to determining that the adjusted number of required free buffer slots exceeds the number of free slots in the buffer; and
storing the incoming packet in the buffer in sequential order in response to determining that the adjusted number of required free buffer slots does not exceed the number of free slots in the buffer.

2. The method of claim 1, wherein calculating a number of free buffer slots required to store the incoming packet in the buffer comprises:

determining a sequence number of the incoming packet;
determining a sequence number of a last-buffered packet; and
calculating the number of required free buffer slots as a difference between the sequence number of the incoming packet and the sequence number of the last-buffered packet.

3. The method of claim 1, wherein determining a number of previously rejected packets based on the packet rejection history comprises:

determining a sequence number of the incoming packet;
determining a sequence number of a last-buffered packet; and
determining the number of previously rejected packets in the packet rejection history having a sequence number greater than the sequence number of the last-buffered packet and less than the sequence number of the incoming packet.

4. The method of claim 3, wherein storing the incoming packet in the buffer in sequential order comprises:

determining a slot index value of a last-buffered packet;
determining whether the adjusted number of required free buffer slots is a negative number;
storing the incoming packet in a slot of the buffer based on the slot index value of the last-buffered packet and the adjusted number of required free buffer slots in response to determining that the adjusted number of required free buffer slots is not a negative number; and
in response to determining that the adjusted number of required free buffer slots is a negative number:
  determining a number of rejected packets in the packet rejection history between the sequence number of the incoming packet and a sequence number of the last-buffered packet;
  calculating a slot index offset based on the adjusted number of required free buffer slots and the determined number of rejected packets in the packet rejection history between the sequence number of the incoming packet and a sequence number of the last-buffered packet; and
  storing the incoming packet in a slot of the buffer based on the slot index value of the last-buffered packet and the slot index offset.

5. The method of claim 1, further comprising:
- determining a sequence number of a packet in the buffer that is playing;
- determining whether there is an entry in the packet rejection history for a packet having a sequence number less than the sequence number of the packet in the buffer that is playing; and
- removing the entry from the packet rejection history in response to determining that there is an entry in the packet rejection history for a packet having a sequence number less than the sequence number of the packet in the buffer that is playing.

6. A receiver device, comprising:
- a transceiver configured to receive voice over Internet protocol (VoIP) media packets;
- a memory configured to function as a buffer for received VoIP media packets; and
- a processor coupled to the transceiver and the memory, wherein the processor is configured with processor-executable instructions to perform operations comprising:
  - calculating a number of free buffer slots required to store an incoming packet in the buffer;
  - determining a number of previously rejected packets based on a packet rejection history;
  - calculating an adjusted number of required free buffer slots as a difference between the number of required free buffer slots and the number of previously rejected packets;
  - determining a number of free slots in the buffer;
  - determining whether the adjusted number of required free buffer slots exceeds the number of free slots in the buffer;
  - rejecting the incoming packet and updating the packet rejection history to include an entry for the rejected incoming packet in response to determining that the adjusted number of required free buffer slots exceeds the number of free slots in the buffer; and
  - storing the incoming packet in the buffer in sequential order in response to determining that the adjusted number of required free buffer slots does not exceed the number of free slots in the buffer.

7. The receiver device of claim 6, wherein the processor is configured with processor-executable instructions to perform operations such that calculating a number of free buffer slots required to store the incoming packet in the buffer comprises:
- determining a sequence number of the incoming packet;
- determining a sequence number of a last-buffered packet; and
- calculating the number of required free buffer slots as a difference between the sequence number of the incoming packet and the sequence number of the last-buffered packet.

8. The receiver device of claim 6, wherein the processor is configured with processor-executable instructions to perform operations such that determining a number of previously rejected packets based on the packet rejection history comprises:
- determining a sequence number of the incoming packet;
- determining a sequence number of a last-buffered packet; and
- determining the number of previously rejected packets in the packet rejection history having a sequence number greater than the sequence number of the last-buffered packet and less than the sequence number of the incoming packet.

9. The receiver device of claim 8, wherein the processor is configured with processor-executable instructions to perform operations such that storing the incoming packet in the buffer in sequential order comprises:
- determining a slot index value of a last-buffered packet;
- determining whether the adjusted number of required free buffer slots is a negative number;
- storing the incoming packet in a slot of the buffer based on the slot index value of the last-buffered packet and the adjusted number of required free buffer slots in response to determining that the adjusted number of required free buffer slots is not a negative number; and
- in response to determining that the adjusted number of required free buffer slots is a negative number:
  - determining a number of rejected packets in the packet rejection history between the sequence number of the incoming packet and a sequence number of the last-buffered packet;
  - calculating a slot index offset based on the adjusted number of required free buffer slots and the determined number of rejected packets in the packet rejection history between the sequence number of the incoming packet and a sequence number of the last-buffered packet; and
  - storing the incoming packet in a slot of the buffer based on the slot index value of the last-buffered packet and the slot index offset.

10. The receiver device of claim 6, wherein the processor is configured with processor-executable instructions to perform operations further comprising:
- determining a sequence number of a packet in the buffer that is playing;
- determining whether there is an entry in the packet rejection history for a packet having a sequence number less than the sequence number of the packet in the buffer that is playing; and
- removing the entry from the packet rejection history in response to determining that there is an entry in the packet rejection history for a packet having a sequence number less than the sequence number of the packet in the buffer that is playing.

11. A receiver device, comprising:
- means for receiving voice over Internet protocol (VoIP) media packets;
- buffering means for buffering received VoIP media packets;
- means for calculating a number of free buffer slots required to store an incoming packet in the buffering means;
- means for determining a number of previously rejected packets based on a packet rejection history;
- means for calculating an adjusted number of required free buffer slots as a difference between the number of required free buffer slots and the number of previously rejected packets;
- means for determining a number of free slots in the buffering means;
- means for determining whether the adjusted number of required free buffer slots exceeds the number of free slots in the buffering means;
- means for rejecting the incoming packet and updating the packet rejection history to include an entry for the rejected incoming packet in response to determining that the adjusted number of required free buffer slots exceeds the number of free slots in the buffering means; and
- means for storing the incoming packet in the buffering means in sequential order in response to determining that the adjusted number of required free buffer slots does not exceed the number of free slots in the buffering means.

12. The receiver device of claim 11, wherein means for calculating a number of free buffer slots required to store the incoming packet in the buffering means comprises:
- means for determining a sequence number of the incoming packet;
- means for determining a sequence number of a last-buffered packet; and
- means for calculating the number of required free buffer slots as a difference between the sequence number of the incoming packet and the sequence number of the last-buffered packet.

13. The receiver device of claim 11, wherein means for determining a number of previously rejected packets based on the packet rejection history comprises:
- means for determining a sequence number of the incoming packet;
- means for determining a sequence number of a last-buffered packet; and
- means for determining the number of previously rejected packets in the packet rejection history having a sequence number greater than the sequence number of the last-buffered packet and less than the sequence number of the incoming packet.

14. The receiver device of claim 13, wherein means for storing the incoming packet in the buffering means in sequential order comprises:
- means for determining a slot index value of a last-buffered packet;
- means for determining whether the adjusted number of required free buffer slots is a negative number;
- means for storing the incoming packet in a slot of the buffering means based on the slot index value of the last-buffered packet and the adjusted number of required free buffer slots in response to determining that the adjusted number of required free buffer slots is not a negative number; and
- means for performing, in response to determining that the adjusted number of required free buffer slots is a negative number, the operations of:
  - determining a number of rejected packets in the packet rejection history between the sequence number of the incoming packet and a sequence number of the last-buffered packet;
  - calculating a slot index offset based on the adjusted number of required free buffer slots and the determined number of rejected packets in the packet rejection history between the sequence number of the incoming packet and a sequence number of the last-buffered packet; and
  - storing the incoming packet in a slot of the buffering means based on the slot index value of the last-buffered packet and the slot index offset.

15. The receiver device of claim 11, further comprising:
- means for determining a sequence number of a packet in the buffering means that is playing;
- means for determining whether there is an entry in the packet rejection history for a packet having a sequence number less than the sequence number of the packet in the buffer that is playing; and
- means for removing the entry from the packet rejection history in response to determining that there is an entry in the packet rejection history for a packet having a sequence number less than the sequence number of the packet in the buffer that is playing.

16. A non-transitory processor-readable storage medium having stored thereon processor-executable instructions configured to cause a processor of a receiver device to perform operations comprising:
- calculating a number of free buffer slots required to store an incoming voice over Internet protocol (VoIP) media packet in a buffer of the receiver device;
- determining a number of previously rejected packets based on a packet rejection history;
- calculating an adjusted number of required free buffer slots as a difference between the number of required free buffer slots and the number of previously rejected packets;
- determining a number of free slots in the buffer;
- determining whether the adjusted number of required free buffer slots exceeds the number of free slots in the buffer;
- rejecting the incoming packet and updating the packet rejection history to include an entry for the rejected incoming packet in response to determining that the adjusted number of required free buffer slots exceeds the number of free slots in the buffer; and
- storing the incoming packet in the buffer in sequential order in response to determining that the adjusted number of required free buffer slots does not exceed the number of free slots in the buffer.

17. The non-transitory processor-readable storage medium of claim 16, wherein the stored processor-executable instructions are configured to cause a processor of a receiver device to perform operations such that calculating a number of free buffer slots required to store the incoming packet in the buffer comprises:
- determining a sequence number of the incoming packet;
- determining a sequence number of a last-buffered packet; and
- calculating the number of required free buffer slots as a difference between the sequence number of the incoming packet and the sequence number of the last-buffered packet.

18. The non-transitory processor-readable storage medium of claim 16, wherein the stored processor-executable instructions are configured to cause a processor of a receiver device to perform operations such that determining a number of previously rejected packets based on the packet rejection history comprises:
- determining a sequence number of the incoming packet;
- determining a sequence number of a last-buffered packet; and
- determining the number of previously rejected packets in the packet rejection history having a sequence number greater than the sequence number of the last-buffered packet and less than the sequence number of the incoming packet.

19. The non-transitory processor-readable storage medium of claim 18, wherein the stored processor-executable instructions are configured to cause a processor of a receiver device to perform operations such that storing the incoming packet in the buffer in sequential order comprises:
- determining a slot index value of a last-buffered packet;
- determining whether the adjusted number of required free buffer slots is a negative number;
- storing the incoming packet in a slot of the buffer based on the slot index value of the last-buffered packet and the adjusted number of required free buffer slots in response to determining that the adjusted number of required free buffer slots is not a negative number; and in response to determining that the adjusted number of required free buffer slots is a negative number:
    determining a number of rejected packets in the packet rejection history between the sequence number of the incoming packet and a sequence number of the last-buffered packet;
    calculating a slot index offset based on the adjusted number of required free buffer slots and the determined number of rejected packets in the packet rejection history between the sequence number of the incoming packet and a sequence number of the last-buffered packet; and
    storing the incoming packet in a slot of the buffer based on the slot index value of the last-buffered packet and the slot index offset.

20. The non-transitory processor-readable storage medium of claim 16, wherein the stored processor-executable instructions are configured to cause a processor of a receiver device to perform operations further comprising:
    determining a sequence number of a packet in the buffer that is playing;
    determining whether there is an entry in the packet rejection history for a packet having a sequence number less than the sequence number of the packet in the buffer that is playing; and
    removing the entry from the packet rejection history in response to determining that there is an entry in the packet rejection history for a packet having a sequence number less than the sequence number of the packet in the buffer that is playing.

* * * * *